United States Patent
Bergman et al.

(10) Patent No.: US 7,266,545 B2
(45) Date of Patent: Sep. 4, 2007

(54) METHODS AND APPARATUS FOR INDEXING IN A DATABASE AND FOR RETRIEVING DATA FROM A DATABASE IN ACCORDANCE WITH QUERIES USING EXAMPLE SETS

(75) Inventors: Lawrence D. Bergman, Mount Kisco, NY (US); Vittorio Castelli, Croton-on-Hudson, NY (US); Chung-Sheng Li, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 09/923,530

(22) Filed: Aug. 7, 2001

(65) Prior Publication Data
US 2003/0033300 A1 Feb. 13, 2003

(51) Int. Cl.
*G06F 17/30* (2006.01)
(52) U.S. Cl. .................... 707/3; 707/10; 707/104.1
(58) Field of Classification Search .................. 707/3, 707/4, 5, 10, 104.1; 382/305, 306, 307, 308
See application file for complete search history.

(56) References Cited

U.S. PATENT DOCUMENTS

| | | | | |
|---|---|---|---|---|
| 5,644,765 A * | 7/1997 | Shimura et al. | ......... | 707/104.1 |
| 5,696,964 A * | 12/1997 | Cox et al. | ........... | 707/5 |
| 5,991,755 A * | 11/1999 | Noguchi et al. | ........... | 707/3 |
| 6,026,388 A * | 2/2000 | Liddy et al. | ........... | 707/1 |
| 6,584,465 B1 * | 6/2003 | Zhu et al. | ........... | 707/6 |
| 6,681,060 B2 * | 1/2004 | Acharya et al. | ........... | 707/6 |
| 6,704,725 B1 * | 3/2004 | Lee | ........... | 707/4 |
| 6,744,935 B2 * | 6/2004 | Choi et al. | ........... | 382/305 |
| 6,766,316 B2 * | 7/2004 | Caudill et al. | ........... | 707/3 |
| 6,834,288 B2 * | 12/2004 | Chen et al. | ........... | 707/104.1 |
| 6,999,636 B1 * | 2/2006 | Enokida et al. | ........... | 382/305 |
| 7,194,453 B2 * | 3/2007 | Yamamoto et al. | ........... | 707/3 |
| 2002/0051576 A1 * | 5/2002 | Choi et al. | ........... | 382/218 |
| 2005/0102246 A1 * | 5/2005 | Movellan et al. | ........... | 706/12 |

OTHER PUBLICATIONS

Wang et al. Image retrieval with SVM active learning embedding Euclidean Search, Image Processing, 2003, V. 1, pp. 715-718, date Sep. 14-17, 2003.*

(Continued)

*Primary Examiner*—John Breene
*Assistant Examiner*—Baoquoc N. To
(74) *Attorney, Agent, or Firm*—Anne V. Dougherty; Ryan, Mason & Lewis, LLP

(57) ABSTRACT

A computer-based technique is provided for retrieving one or more items from a database in response to a query specified by a user via one or more example sets. Preferably the example sets include multiple positive and negative example sets. The method comprises the following steps. First, a scoring function is constructed from the one or more example sets. The scoring function gives higher scores to database items that are more closely related to the query than to database items that are not as closely related to the query. The scoring function is operable for use with a multidimensional indexing structure associated with the database. Then, the one or more database items that have the highest score as computed using the scoring function are retrieved via the multidimensional indexing structure.

43 Claims, 11 Drawing Sheets

OTHER PUBLICATIONS

Cheuk et al. Using shape distribute to compare solid models, ACM Symposium on Solid and Physical Models, pp. 273-280, date 2002.*

Shaft et al. Theory of rearest neighbors indexability, ACM Transactions on Database System (TODS), V. 31, Issue. 3 pages 814-838, date 2006.*

U.S. Appl. No. 09/237,646, filed Jan. 26, 1999, V. Castelli et al., "Method and Apparatus for Similarity Retrieval from Iterative Refinement.".

I.J. Cox et al., "The Bayesian Image Retrieval System, *PicHunter*: Theory, Implementation and Psychophysical Experiments," IEEE Transactions on Image Processing, pp. 1-19, 2000.

S. Santini et al., "Similarity Measures," IEEE Transactions on Pattern Analysis and Machine Intelligence, vol. 21, No. 9, pp. 871-883, Sep. 1999.

X. Wan et al., Efficient Interactive Image Retrieval With Multiple Seed Images, SPIE Conference on Multimedia Storage and Archiving Systems III, Bostson, MA, pp. 13-24, Nov. 1998.

V. Gaede, "Multidimensional Access Methods," ACM Computing Surveys, vol. 30, No. 2, pp. 170-231, Jun. 1998.

B. Bhanu et al., "Learning Feature Relevance and Similarity Metrices in Image Databases," IEEE, pp. 14-18, 1998.

T-S. Chua, "Relevance Feedback Techniques for Color-based Image Retrieval," IEEE, pp. 24-31, 1998.

Y. Rui et al., "Relevance Feedback: A Power Tool for Interactive Content-Based Image Retrieval," IEEE, pp. 644-655, 1998.

M.E.J. Wood et al., "Iterative Refinement by Relevance Feedback in Content-Based Digital Image Retrieval," ACM Multimedia, Bristol, UK, pp. 13-20, 1998.

W.Y. Ma et al., "Texture Features and Learning Similarity," IEEE, pp. 425-430, 1996.

M. Flickner et al., "Query by Image and Video Content: The QBIC System," IEEE, pp. 23-32, Sep. 1995.

B.S. Kim et al., "A Fast κ Nearest Neighbor Finding Algorithm Based on the Ordered Partition," IEEE, pp. 367-372, 1986.

L. Devroye et al., "The Bayes Error," A Probabilistic Theory of Pattern Recognition, Chapter 2, 13 pages, 1996.

C-S. Li et al., "Sequential Processing for Content-Based Retrieval of Composite Objects," Proc. SPIE, vol. 3312 Storage and Retrieval for Image and Video Databases IV, pp. 1-12, Jan. 1998.

* cited by examiner

METHODS AND APPARATUS FOR INDEXING IN A DATABASE AND FOR RETRIEVING DATA FROM A DATABASE IN ACCORDANCE WITH QUERIES USING EXAMPLE SETS

This invention was made with U.S. Government support under contract no. NCC5-305 awarded by the National Aeronautic and Space Administration (NASA). The U.S. Government may have certain rights in this invention.

FIELD OF THE INVENTION

The present invention relates to indexing and similarity retrieval techniques used in accordance with databases and, more particularly, to such indexing and similarity retrieval techniques wherein a query is specified in accordance with example sets.

BACKGROUND OF THE INVENTION

In a computer system containing a database supporting similarity searches, the term "query-by-example" denotes a paradigm where the user specifies a query by providing examples, e.g., as described in M. Flickner et al., "Query By Image and Video Content: the QBIC System," IEEE Computer Magazine, 28(9), pp. 23-32, September 1995, the disclosure of which is incorporated by reference herein. In a multimedia database, an example can be an existing image or video, or a sketch drawn by the user. In a traditional database, an example can be a particular record.

There are at least two types of queries that can be specified by means of an example:

(1) best-k-matches: Here, the search engine must return the k database items that more closely match the concept specified by the user. The search engine uses the example to compute quantities (features), that are compared to the features of the items stored in the database. In multimedia databases, typical features include color, texture and shape. Given two items in the database, the one with more similar features to the query is considered the better match.

(2) threshold search: Here, the search engine returns all the items in the database that are more similar than a specified similarity level to the concept described by the user. The difference from the previous type of query resides in the similarity function, which is known (to a certain extent) to the user.

A similarity search using a single example is only moderately effective. To improve retrieval performance, the user can provide multiple examples, as described in X. Wan et al., "Efficient Interactive Image Retrieval with Multiple Seed Images," Proc. SPIE, vol 3527: Multimedia Storage and Archiving III, pp. 13-24, November 1998, the disclosure of which is incorporated by reference herein. Multiple examples are used to estimate the relative importance of the different features used in the retrieval, which translates into giving different weights to different features while computing similarity. As disclosed in X. Wan et al., the distance between the query vector x and a target vector y is then computed as:

$$d^2(x,y) = \Sigma w_i (x[i]-y[i])^2, \quad (1)$$

where the sum is over the M features in the feature vectors, and the w are different weights.

For instance, if there are N positive examples, having feature vectors $x_1, \ldots, x_N$, a possible choice of weight for the ith feature is $w[wi]=[(x_1[i]^2+x_2[i]^2+ \ldots +x_N[i]^2)/N]^{-1/2}$, where $x_j[i]$ is the value of the ith feature for the jth example. These examples can be positive (examples of the desired content) or negative (examples of undesired content). X. Wan et al. describes how to use both positive and negative examples to compute the weights $w_i$.

Other distance metrics that can be used instead of the distance metric denoted in equation (1) include weighted Lp distances, computed as:

$$d^p(x,y) = (\Sigma w_i (x[i]-y[i])^p)^{1/p}$$

and quadratic distances, computed as:

$$d(x,y) = (x-y)^T K^{-1} (x-y)$$

where K is a non-singular, positive-definite matrix, the −1 superscript denotes the matrix inverse operator, and the T superscript denotes transposition.

Most authors disclose how to solve the similarity search problem in a classification-like setting: they divide the database into classes, by learning from the user's input, as in B. Bhanu et al., "Learning Feature Relevance and Similarity Metrics in Image Databases," Proc. IEEE Workshop on Content-Based Access of Image and Video Libraries, pp. 14-18, 1998; W. Y. Ma et al., "Texture Features and Learning Similarity," Proc. IEEE Conf. Computer Vision and Pattern Recognition, pp. 425-430, 1996; and J. Cox et al., "The Bayesian Image Retrieval System, PicHunter: Theory, Implementation and Psychophysical Experiments," IEEE Trans. on Image Processing, 9(1), pp. 20-37, January 2000, the disclosures of which are incorporated by reference herein.

Static approaches can be used, where the user's feedback is not allowed. For example, W. Y. Ma et al. (in the above-referenced W. Y. Ma et al. article) discloses how to partition the database into clusters using a neural network approach. The W. Y. Ma et al. method requires labeling each database entry with a class label, hence, it is tantamount to providing all the entries in the database as examples. The method is static since it produces a fixed pseudo-distance on the search space. This pseudo-distance does not depend on the individual queries, and cannot be changed by a user. The computational cost of the approach is prohibitive for large databases.

Dynamic approaches, such as described in the above-referenced B. Bhanu et al. article, learn on-line, i.e., at query time. Mixed approaches, such as described in M. E. J. Wood et al., "Iterative Refinement by Relevance Feedback in Content-Based Digital Image Retrieval," Proc. of the sixth ACM Int. Conf. Multimedia, pp. 13-20, 1998, the disclosure of which is incorporated by reference herein, use both query-time and off-line learning.

However, a problem with the classification-like approach is the lack of evidence regarding the existence of semantic classes associated with similarity retrieval. In other words, there is no evidence that the user is interested in a particular semantic concept when retrieving data based on similarity. Inferring the existence of such classes from the user's example reduces the flexibility of the system. The approach is valuable only if the user asks over and over for the same content, which is a rare occurrence.

In the relevance-feedback literature, authors propose solutions on how to use sets of positive and negative examples that are iteratively provided as input to the system. They assume that the user provides a set of positive examples or a set of negative examples (or both) at each iteration. The area of relevance feedback has been studied for the past 30 years. There are two main categories of relevance-feedback techniques from the viewpoint of how the system deals with examples provided during different iterations: (1) static query rewrite, where at each iteration the same weights are given to all the examples irrespective of when they were added to the query, e.g., R. Yong et al., "Relevance Feedback: A Power Tool For Interactive Content-Based Image Retrieval," IEEE Trans. on Circuits and Systems for Video Technology, 8(5), pp. 644-655, September 1998, the disclosure of which is incorporated by reference herein; and (2) time-weighted query rewrite, where the system gives more importance to the most recently provided examples.

Relevance-feedback techniques can also be divided in two categories, depending on how the examples are used: (1) techniques that use adaptive ranking functions use the positive and negative examples to modify the weights of distance functions, such as in equation (1) or variations, and are suited for on-line searches (e.g., the above-referenced R. Yong et al. article); and (2) techniques that perform feature-space warping actually change the structure of the search space in non-linear fashions, are computationally very expensive, and are best suited for off-line learning, e.g., U.S. patent application identified by Ser. No. 09/237,646 filed on Jan. 26, 1999 and entitled "Method and Apparatus for Similarity Retrieval from Iterative Refinement;" and C. -S. Li et al., "Sequential Processing for Content-Based Retrieval of Multimedia Objects," Proc. SPIE, vol. 3312 Storage and Retrieval for Image and Video Databases IV, pp. 2-13, January 1998, the disclosures of which are incorporated by reference herein. It is to be understood that "on-line" describes operations performed substantially contemporaneous with receipt of the user query (e.g., real-time or interactive), while "off-line" describes operations that are not performed on-line (e.g., not supporting an interactive mode of operation). There is, therefore, a need to allow the user to simultaneously provide multiple sets of positive and negative examples and to use them in an on-line setting.

The process of searching a database is complex and time consuming. Data structures, called indexes or indexing structures, are used to speed up the process. In particular, multidimensional access methods simultaneously index several variables, for instance, as described in V. Gaede et al., "Multidimensional Access Methods," ACM Computing Surveys, 20(2), pp. 170-231, June 1998, the disclosure of which is incorporated by reference herein. Multidimensional indexing methods are used for point queries and range queries, as disclosed in the above-referenced V. Gaede et al. article, and for nearest-neighbor queries, as disclosed in B. S. Kim et al., "A Fast K Nearest Neighbor Algorithm Based on the Order Partition," IEEE Trans. Pattern Analysis and Machine Intelligence, PAMI-8(6), pp. 761-766, November 1986, the disclosure of which is incorporated by reference herein, but not for similarity queries based on multiple example sets. There is, therefore, a need for indexing structures supporting similarity queries based on multiple positive and negative example sets.

SUMMARY OF THE INVENTION

The present invention provides computer-based techniques for retrieving one or more items from a database in response to a query specified by a user via one or more example sets. Preferably the example sets include multiple positive and negative example sets.

In one aspect of the invention, a retrieval method comprises the following steps. First, a scoring function is constructed from the one or more example sets. The scoring function preferably gives higher scores to database items that are more closely related to the query than to database items that are not as closely related to the query. The scoring function is operable for use with a multidimensional indexing structure associated with the database. Then, the one or more database items that have the highest score as computed using the scoring function are retrieved via the multidimensional indexing structure. Thus, the invention comprises methodologies for constructing a scoring function on-line and for retrieving desired similar records from a database using a multidimensional index.

Advantageously, the present invention realizes that the construction of a scoring function is an estimation problem, similar to the estimation of a regression function. Thus, unlike conventional similarity retrieval techniques, the present invention does not rely on a simplifying classification framework.

The present invention also realizes that constructing and maintaining multidimensional indexing structures are computationally expensive tasks. Substantial advantages are therefore gained if a similarity search based on multiple example sets and conventional queries (i.e., point queries, range queries or nearest-neighbor queries) could be supported by the same indexing structure. Further, since multidimensional indexing structures supporting point, range and nearest-neighbor queries are well understood and therefore optimized versions exist, it would be advantageous to have a method to perform a similarity search based on multiple example sets using an available indexing structure that supports point, range or nearest-neighbor queries, and in particular using the most common such methods, for example, the R-Trees, the k-d Trees, the Quadtrees and derived structures, as disclosed in the above-referenced V. Gaede et al. article.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENT

Figure 1:
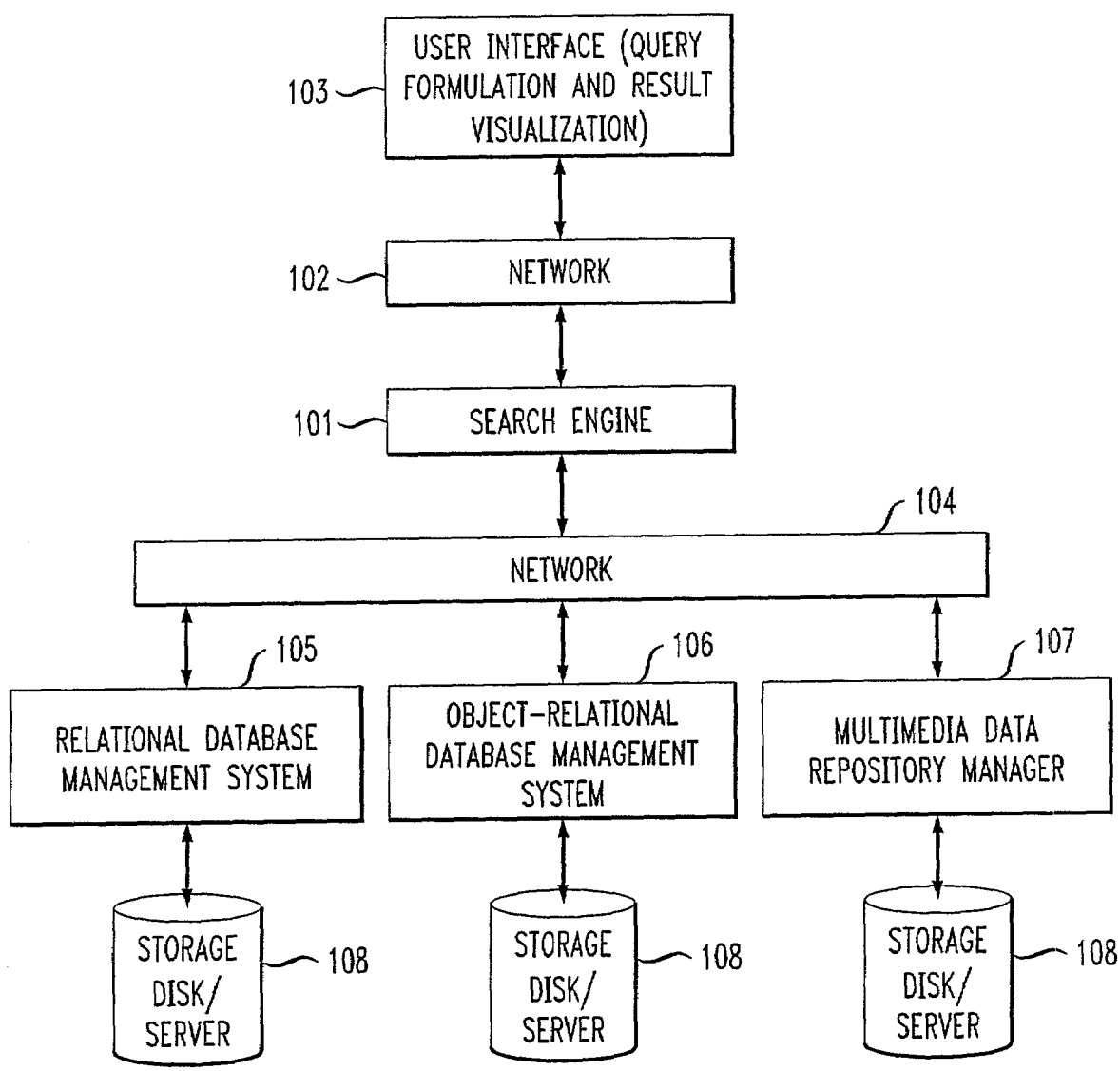
FIG. 1 is a block diagram illustrating an embodiment of a database environment in which the present invention may be implemented.

Before providing a detailed description of preferred embodiments of the invention, certain definitions used in the detailed description will now be provided.

(1) Feature Space: By feature space, we denote the collection of possible values of the set of attributes used to search the database. In a preferred embodiment, a traditional database is searched using the values in a subset of the existing numerical columns, the feature space is a multidimensional Euclidean space where each dimension is associated with a different column.

More generally, if a column is numeric, then the feature space is the Cartesian product of the real line and of the feature space of the remaining columns. If a column is categorical or it can take a finite number of values, the feature space is the Cartesian product of the set of possible values of that column and of the feature space of the remaining columns. Hence, a database column corresponds to a distinct dimension in the feature space.

In another preferred embodiment, an object-relational database is searched, using the values of a group of attributes. The feature space is the domain of definition of the set of attributes used in the search. If an attribute is numeric, then the feature space is the Cartesian product of the real line and of the feature space of the set of remaining attributes. If an attribute is categorical, or takes a finite number of values, then the feature space is the Cartesian product of the set of possible values of the attribute and of the feature space of the remaining attributes. Hence, each attribute corresponds to a distinct dimension in the feature space.

(2) Search Space: The collection of database records considered during the current step of the search. All the embodiments are described in reference to a database, however, one skilled in the art will appreciate that the same descriptions apply to different assumptions. For example, instead of a database, the invention can be applied to a collection of databases, a federation of databases, a spreadsheet, data provided manually by an operator, data automatically produced by measurement equipment, data provided by a knowledge provider, including, but not limited to, real-time stock prices, etc.

(3) Example: The present invention is concerned with queries specified by providing examples. An example is any element of the feature space. In practice, the user can provide, as an example, a database record. In this case, only the columns (or attributes) of the database record that correspond to dimensions in the feature space are considered, and the others are discarded. In a preferred embodiment, the database contains multimedia objects, and the feature space is obtained from low-level numerical or categorical features, such as texture descriptors in the case of images. The user provides as an example a multimedia object, such as an image, or a portion of it. The low-level features are extracted from the multimedia object. In this embodiment, the term example refers interchangeably to the multimedia object and to its representation in terms of low-level features.

(4) Example set: An example set in accordance with the invention is a collection of examples that the user deems as similar to each other with respect to some characteristics. The user need not specify exactly which characteristics are homogeneous across the examples in the example set. Further, in accordance with the invention, an example set always contains examples that are similar with respect to one or more characteristics, such one or more characteristics being interpreted as defining characteristics of the example set. The terms "sample" and "example" may be used synonymously in accordance with the invention.

(5) Scoring function: A scoring function is a function defined on the feature space, that assigns a numeric value, called a score, to each element of the feature space. In accordance with the present invention, scoring functions are used to decide which elements of the database are to be retrieved in response to a given query. The "scoring function properties" that are relevant to the present invention are the following:

(a) a higher value of the scoring function is interpreted as a better fit to the query; and (b) without loss of generality, in accordance with the present invention, a scoring function takes values between zero and one.

It will be apparent to one skilled in the art that a scoring function taking values in any other range can be transformed to a scoring function that takes values between zero and one using a continuous, monotonic transformation which maintains the desired property.

Additionally, in accordance with the present invention, a score of one (1) is interpreted as a perfect fit, while a score of zero (0) is interpreted as a complete misfit to the query.

Referring initially to FIG. 1, a block diagram illustrates an embodiment of a database environment in which the present invention may be implemented. As shown, a search engine 101 communicates with a user interface 103, either directly or through a local area network or a wide area network 102

(such as the Internet). The user interface 103 allows a user to: construct queries using multiple positive and negative example sets; submit the query to the search engine 101; visualize the results produced by the search engine; and iteratively refine the search. The user interface may be implemented, for example, as a graphical user interface running on a computer system of the user, as is known in the art.

As is further shown, the search engine 101 interfaces, either directly, via a local area network, or a wide area network 104 (again, such as the Internet), with relational database management system 105, object-relational database management system 106, and/or multimedia repository manager 107, which manage data stored on respective disks or in respective storage servers 108. It is to be understood that the search engine may alternatively be integrated with the relational databases, the object-relational databases and the multimedia repositories. In such a case, the search engine may be considered as the server-side component that manages the communication with the user interface 103. Accordingly, the search engine may be implemented on its own dedicated computer system or on the one or more computer systems associated with the database systems shown in FIG. 1.

Figure 2:
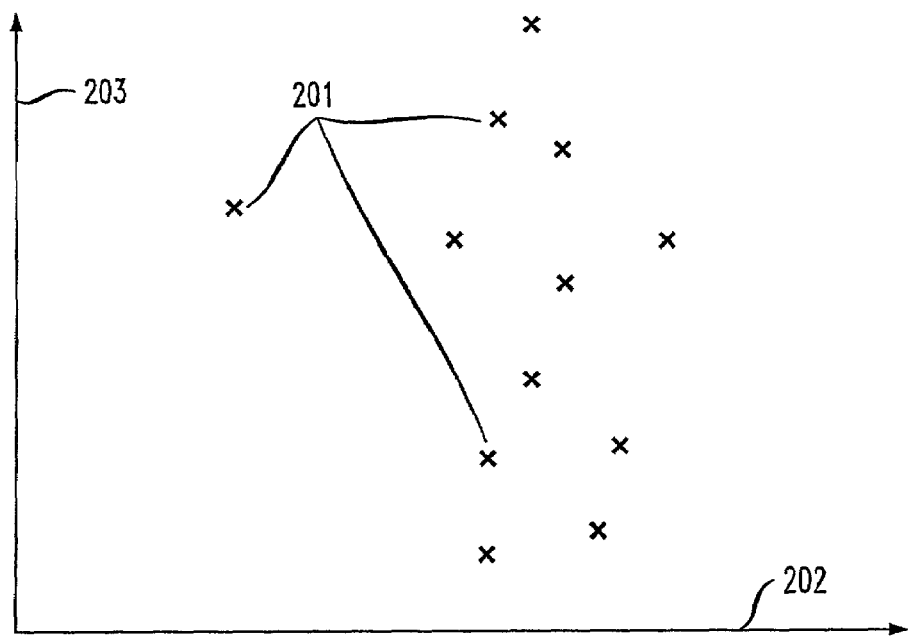
FIG. 2 is a diagram graphically depicting an example set by representing each example as a point in a two-dimensional feature space, each coordinate of which corresponds to the value of a different feature or attribute.

As mentioned, the user may formulate a query in terms of multiple positive and negative example sets in accordance with the user interface 103. An appropriate user-provided example set is in a one-to-one correspondence with a set of points in the feature space. Referring to FIG. 2, a diagram graphically depicts an example set by representing each example as a point in a two-dimensional feature space, each coordinate of which corresponds to the value of a different feature or attribute. More specifically, a set of such points 201 are shown in a two-dimensional feature space, having two orthogonal axes, 202 and 203, each corresponding to a different feature or attribute in the feature space.

With reference to FIGS. 3 to 12, various preferred embodiments of the invention, illustrating how multiple positive and negative example sets are used on-line to construct a scoring function that can be used in conjunction with an existing multidimensional index to execute a user-submitted query, will now be explained. It is to be appreciated that the search engine 101 performs such on-line scoring function construction and query execution in accordance with the methodologies of the invention to be described in detail below.

Figure 3:
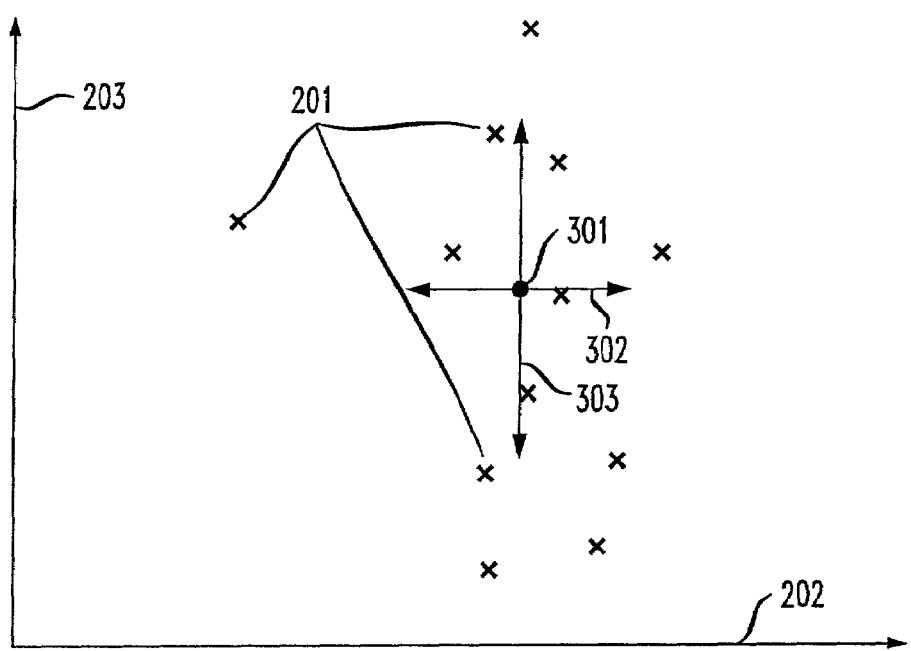
FIG. 3 is a diagram graphically depicting an example of a representative (characteristic) sample and dispersion characterization of the example set shown in FIG. 2.

FIG. 3 is a diagram graphically depicting an example of a representative (characteristic) sample and dispersion characterization of the example set shown in FIG. 2. More specifically, FIG. 3 generally illustrates how the example set of FIG. 2 is used by the search engine 101 to infer what aspects (features or attributes) are perceived as homogeneous by the user (namely, what are the characteristics according to which the examples in the set are perceived to be similar), and to construct a scoring function. First, the search engine infers, from the samples in the example set, a "characteristic example" 301. In a preferred embodiment, where the attributes are numeric, the characteristic example is the centroid of the example set, namely, the value of each of its attributes is the arithmetic average of the corresponding attribute values computed over the examples in the set. In another preferred embodiment, where the attributes are numeric, the characteristic example has attribute values equal to the median of the corresponding attribute values computed over the samples in the set. In yet another embodiment, where some attributes are categorical, the value of each categorical attribute of the characteristic example are the mode (namely, the most frequent value) of the corresponding attribute values computed over the samples in the set.

Next, the search engine infers, from the samples in the example set, a description of the dispersion of the samples in the example set around the characteristic example. In a preferred embodiment, the description of the dispersion is the covariance matrix of the examples. In another preferred embodiment, where the interaction between different attributes is ignored, the dispersion is captured by the standard deviation of the individual attributes of the examples around the characteristic example; the standard deviation of the ith attribute is:

$$s[i] = \{[(x_1[i]-c[i])^2+(x_2[i]-c[i])^2+ \ldots (x_N[i]-c[i])^2]/N\}^{1/2} \quad (2)$$

where $x_j[i]$ is the value of the ith attribute for the jth example, $c[i]$ is the value of the ith attribute of the characteristic example, and N is the number of samples in the example set. The standard deviations are indicated in FIG. 3 by bars with arrows, 302 and 303, aligned with the coordinate axes; the longer the bars, the bigger the dispersion around the characteristic example. Using the standard deviations alone is preferable to using the full covariance matrix when the number of samples in each example set is smaller than the square of the number of attributes on which the search is performed; this is in general a common situation.

It is to be understood that other measures of dispersion can be used in accordance with the present invention, e.g., different embodiments of the invention may use central moments rather than standard deviation; another embodiment may use an order statistics of the differences $|x_1[i]-c[i]|, |x_2[i]-c[i]|, \ldots, |x_N[i]-c[i]|$ for each attribute i, where the notation $|x|$ denotes the absolute value of x. In addition, according to the present invention, further characterizations of the dispersion of the samples in the example set around the characteristic example may be computed, for example, third moments capturing asymmetry.

Figure 4:
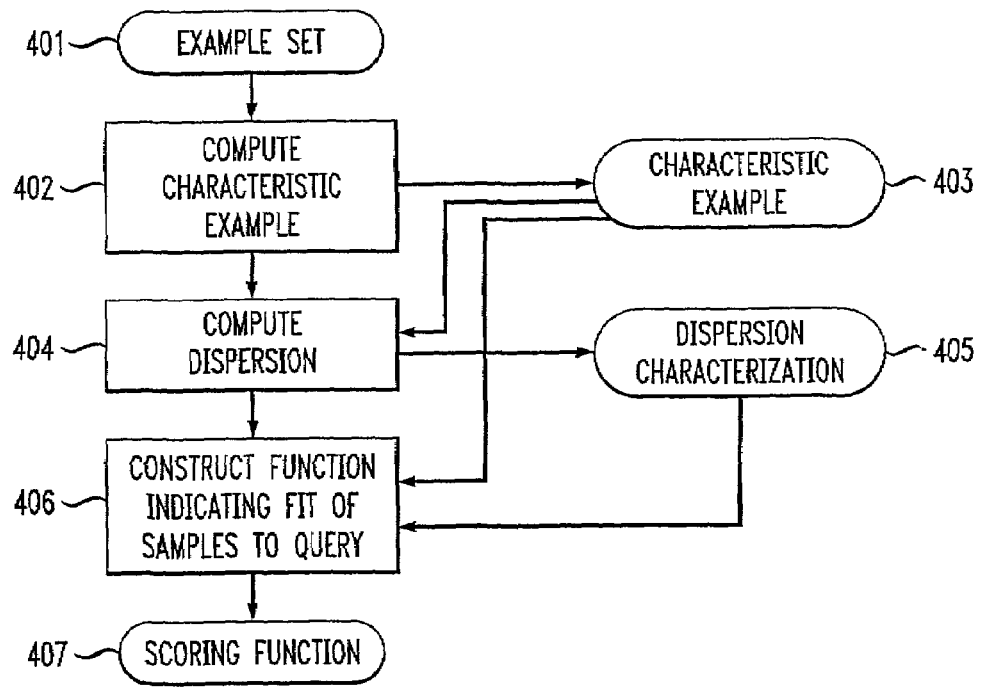
FIG. 4 is a flow diagram illustrating a method of constructing a scoring function from a single example set according to one embodiment of the present invention.
Figure 6:
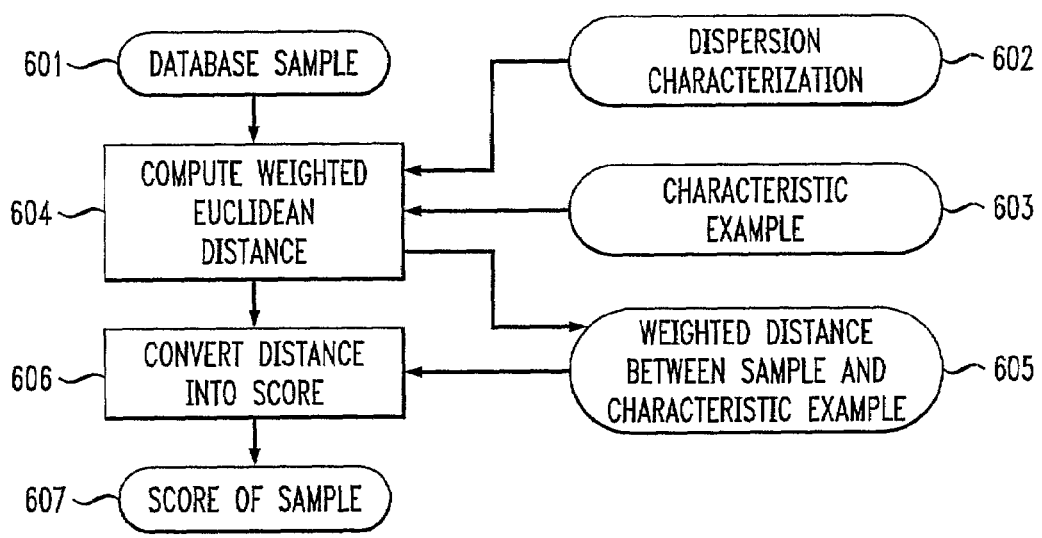
FIG. 6 is a flow diagram illustrating a method of computing the score of a generic database example according to one embodiment of the present invention.

Referring now to FIG. 4, a flow diagram illustrates a method of constructing a scoring function from a single example set 401 according to one embodiment of the present invention. As shown, the characteristic example 403 is computed in step 402, for instance, using one of the methods described above in the description of FIG. 3. The dispersion of the data 405 around the characteristic example (referred to as the dispersion characterization) is then computed in step 404, for instance, using one of the methods described above in the description of FIG. 3. The characteristic example 403 and the dispersion characterization 405 are then used as input to step 406, which produces a scoring function 407, namely, a function that assigns a value, to each possible database item, indicating how well the database item satisfies (fits) the query. FIG. 6 will describe a preferred embodiment for step 406. In accordance with the invention, a similarity or dissimilarity function other than a scoring function taking values between zero and one may be used, as previously discussed.

Figure 5:
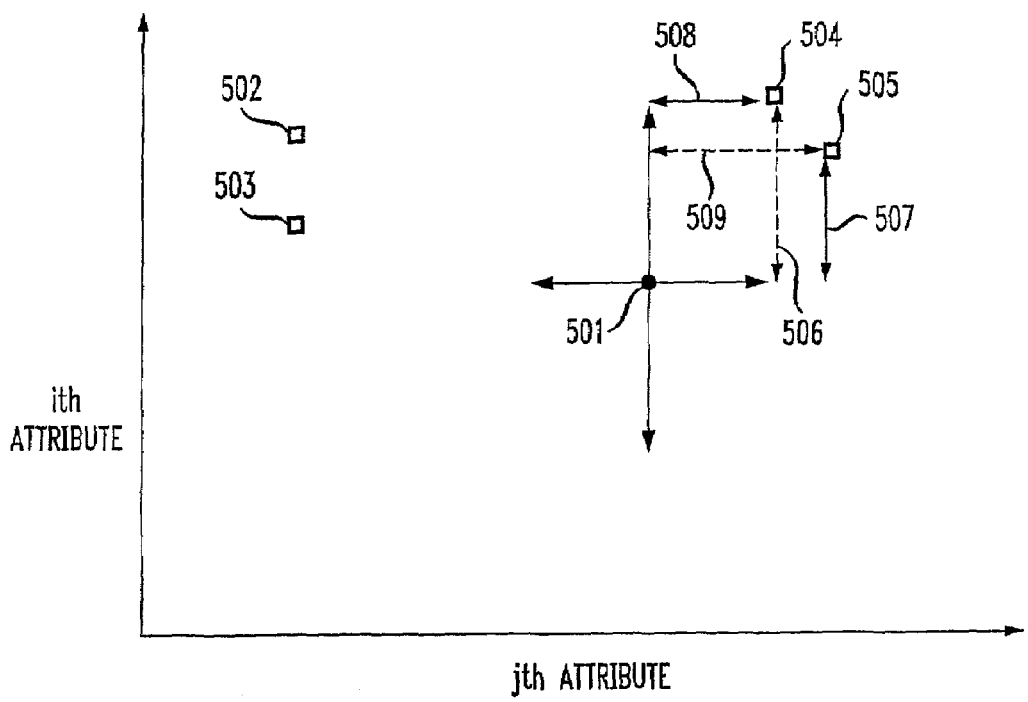
FIG. 5 is a diagram graphically depicting desirable properties of the scoring function of an example set according to one embodiment of the present invention.

In accordance with a preferred embodiment of the invention, the scoring function has the following two "required properties," described with reference to FIG. 5:

(1) Consider two database items (or rows), 502 and 503, whose corresponding attribute values are all identical, except the values of one specific attribute, say, the ith. The database item whose ith attribute value is closer to the ith attribute value of the characteristic example 501 will have a higher score than the other database item, namely, it will match the query better than the other database item. In FIG. 5, database example 503 will have a higher score than database example 502. Hence, if two database items are identical except for the value of one attribute, the database item whose attribute value is more similar to the corresponding attribute value of the characteristic example satisfies the query better.

(2) Consider two database items, say x (504) and y (505), whose corresponding attributes values are identical, except two, say the ith and the jth. Assume additionally that |x[i]−c[i]|=|y[j]−c[j]| and that |x[j]−c[j]|=|y[i]−c[i]|. In FIG 5, the differences |x[i]−c[i]|, |y[i]−c[i]|, |x[j]−c[j]| and |y[i]−c[j]| are graphically indicated by the segments 506, 507, 508 and 509, respectively, and the characteristic example c is 501. Let, as in the figure, |x[i]−c[i]|>|x[j]−c[j]|. Let the dispersion of the example set around the characteristic example be larger along the ith attribute than along the jth attribute. Then, the database item x has a higher score than database item y. Hence, dissimilarity from the characteristic example along attributes with larger dispersion of the example set is less important than dissimilarity along attributes with smaller dispersion of the example set. We can interpret this requirement as follows: if the example set has small dispersion along a specific attribute, that attribute captures the homogeneity of the samples well in the example set; if an attribute has large dispersion, it does not capture homogeneity well. Attributes capturing homogeneity well are more important that attributes that capture homogeneity poorly; hence, dissimilarity from the characteristic example along attributes capturing homogeneity well is weighted more than dissimilarity capturing homogeneity poorly.

FIG. 6 is a flow diagram illustrating a method of computing the score of a generic database example 601, according to one embodiment of the present invention, so as to satisfy the above constraints. The methodology of FIG. 6 may be considered a preferred embodiment for implementing step 406 in FIG. 4. The dispersion characterization 602 and the characteristic example 603 are used in step 604. Step 604 computes the weighted Euclidean distance 605 between the characteristic example 603 and the database item 601 using the dispersion characterization 602 to compute the weights.

In a preferred embodiment, where the dispersion characterization consists of the standard deviations of the individual attributes, the weights used in the weighted Euclidean distance are the reciprocal of the standard deviations. One skilled in the art will appreciate that the distance 605 is an indicator of dissimilarity that has the two above-mentioned required properties. In other embodiments, weighted Minkowsky distances may be used instead of the Euclidean distance 605. One skilled in the art will also appreciate that other distances, as well as semi-metrics, may be used in step 604. In fact, the property of symmetry is not required to satisfy the above-mentioned required properties (1) and (2), and, for example, functions satisfying non-negativity and the triangular inequality may be used instead of a distance in step 604.

Step 606 converts the distance 605 into a score 607 in such a way that the above-mentioned, required scoring function properties (1) and (2) are satisfied. In one embodiment, step 606 produces exp (−d), where exp is the exponential function and d is the weighted Euclidean distance 605. In another embodiment, step 606 computes k/[1+exp (a−b*d)], where k, a, and b are positive constants, and k is equal to (1+exp (a)) in order to satisfy property (2) of the scoring function. One skilled in the art will appreciate that different functions can be used in step 606 in accordance with the present invention.

In a further embodiment of the present invention, the scoring function also preferably satisfies the following additional requirements (that is, in addition to the above-mentioned required properties (1) and (2)):

(3) Database items that are very similar to the characteristic example have a score equal to one. It is likely that the user cannot provide an ideal example set, hence, the query is approximate; database items that are very similar to the characteristic example are declared perfect matches. The user can further refine the query as described later, if desired.

(4) Database items that are very dissimilar to the characteristic example have a score of zero. It is not important to retrieve database items that match the query very poorly.

Thus, in a preferred embodiment, step 606 satisfies properties (1), (2), (3) and (4) by using two thresholds, $T_1$ and $T_2$. If the distance 605 is below $T_1$, the score is one; if the distance 605 is above $T_2$, the score is zero; and if it is between $T_1$ and $T_2$, the score is computed as a monotonically decreasing function of the distance that satisfies properties (1) and (2).

Figure 7A:
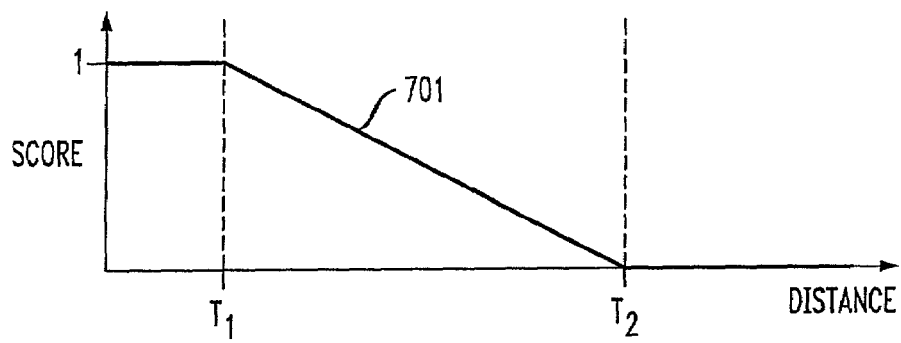
FIGS. 7A and 7B are diagrams graphically depicting two examples of functions that convert distances into scores according to respective embodiments of the present invention.
Figure 7B:
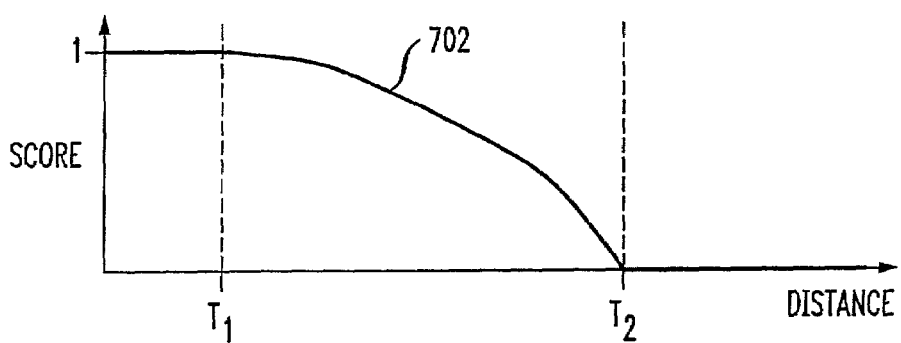

FIGS. 7A and 7B are diagrams graphically depicting two examples of functions that convert distances into scores according to respective embodiments of the present invention. That is, FIGS. 7A and 7B show two possible functions that may be used to perform step 606 in FIG. 6. Function 701 (FIG. 7A) is piecewise linear and continuous. Function 702 (FIG. 7B) has a squared root behavior between the thresholds $T_1$ and $T_2$. Hence, computing the score with function 702 and the Euclidean distance 605 is equivalent to computing the score using the squared Euclidean distance instead of the Euclidean distance 605 and function 701, after appropriately adjusting the thresholds.

Figure 8:
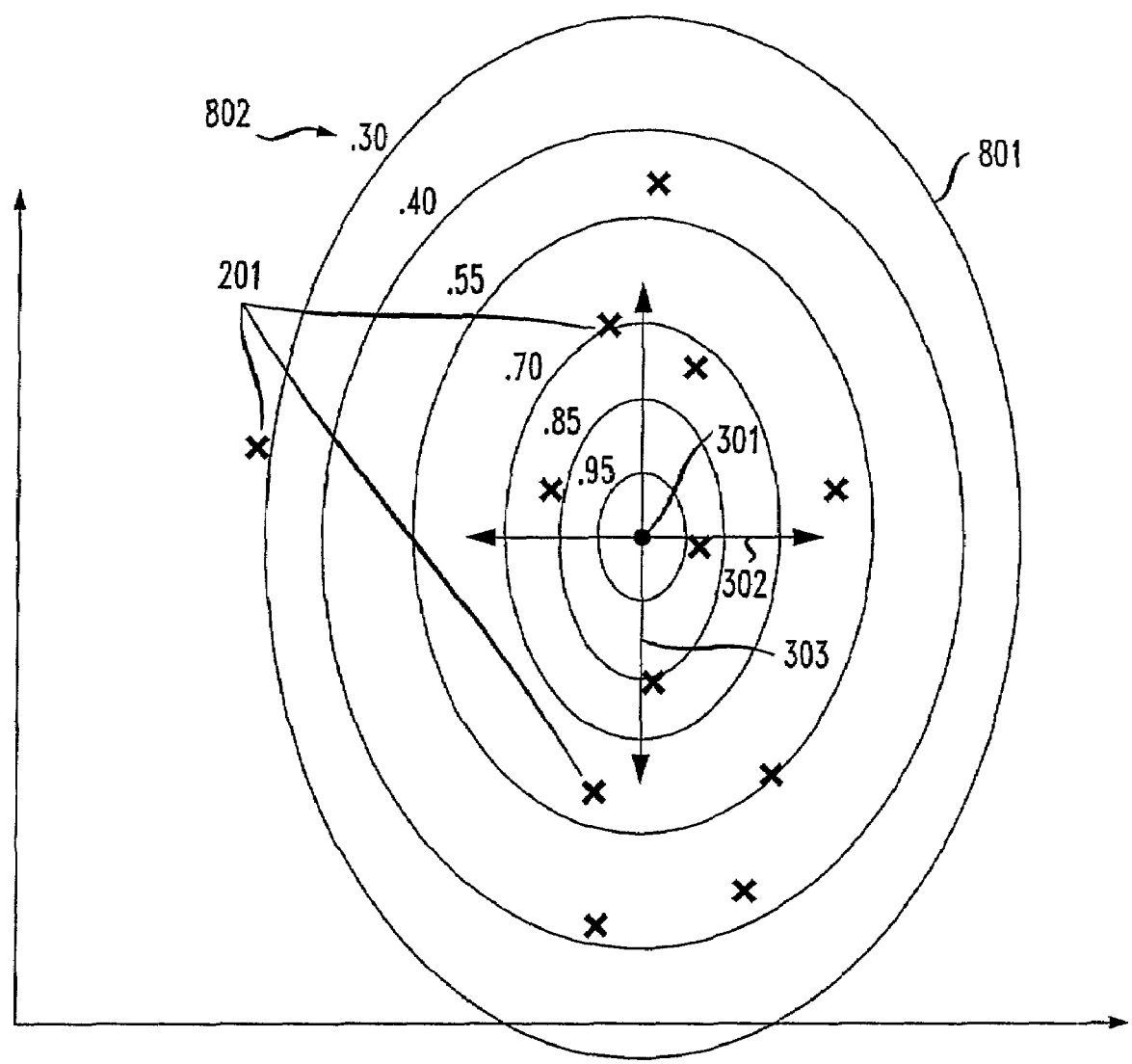
FIG. 8 is a diagram graphically depicting contour lines of a scoring function constructed using the example set of FIG. 2 and the procedures of FIGS. 4 and 6.

It is to be understood that the scoring function, constructed on-line in accordance with the present invention, assigns a score to every point of the feature space. FIG. 8 graphically depicts an example of contour lines of a scoring function constructed with the example set of FIGS. 2 and 3, using the procedures illustrated in FIGS. 4 and 6.

The examples 201, the characteristic sample 301 and the dispersion indicators 302 and 303 are shown as references. The lines 801 connect the set of points of the feature space having the same score. In a D-dimensional feature space, the lines 801 are (D-1)-dimensional surfaces. Only some of the lines are drawn, and the corresponding scores 802 are shown. Note that the scores of more external lines are lower than the scores of internal lines.

These numbers are provided only for illustration purposes, and they would vary depending on the actual detail of the embodiment. Similarly, the lines 801 depicted in the figure are ellipses, since in this embodiment the distance 605 is a weighted Euclidean distance. However, in other embodiments, the lines may have very different forms. For instance, in an embodiment where a weighted Manhattan distance is used in step 605, the lines 801 would be romboids.

Figure 9:
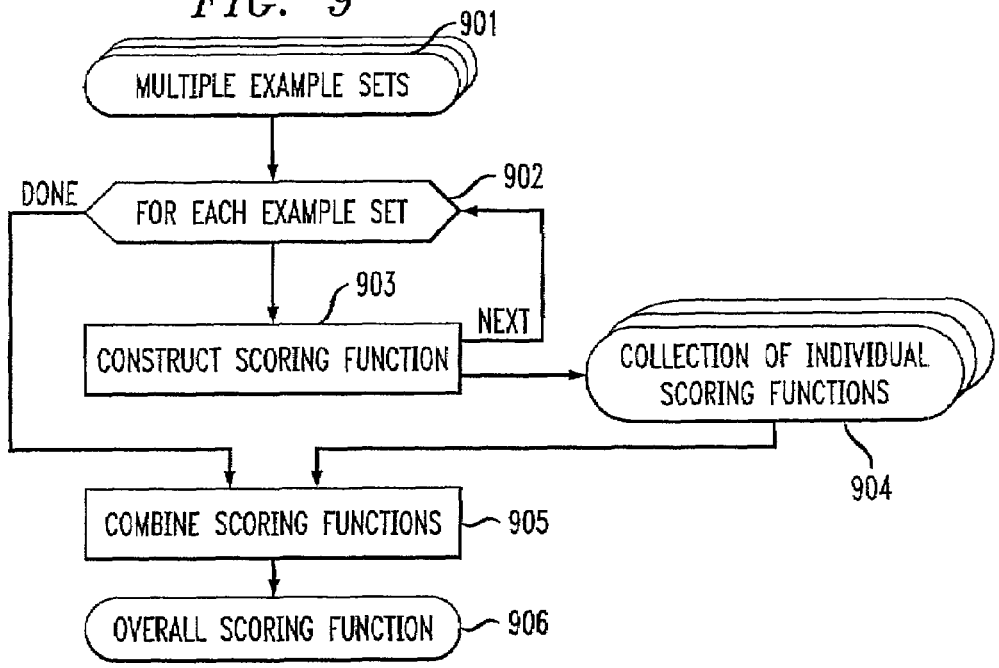
FIG. 9 is a flow diagram illustrating a method of constructing a scoring function from multiple example sets according to one embodiment of the present invention.

Referring now to FIG. 9, a flow diagram illustrates a method of constructing a scoring function from multiple example sets according to one embodiment of the present invention. The user provides multiple example sets 901 to the search engine. The search engine analyzes one example set at a time; the iterator 902 graphically indicates the sequential iteration. Step 903 takes a different example set at each iteration, and constructs the corresponding scoring function, for example as illustrated in FIGS. 4 and 6. When the iterator 902 terminates because all the example sets 901 have been analyzed, step 903 has produced a collection of individual scoring functions 904, one per each of the multiple example sets 901. Step 905 combines the scoring functions of the collection 904 to produce the overall scoring function 906.

In a preferred embodiment, the combining step 905 satisfies the following requirements:

(I) Points in the feature space that have low scores with respect to all the scoring functions of the positive example sets have low scores.

(II) Points in the feature space that have high scores with respect to all the scoring function of the negative example sets have low scores.

(III) Points in the feature space that have high scores with respect to at least one scoring function of the positive example sets and low scores with respect to all the scoring functions of the negative example sets have high scores.

The three requirements imply that database points that look like negative examples will have low scores, database points that look like positive examples but not like negative examples will have high scores, and database points that are very different from any positive example have low scores.

In a preferred embodiment, step 905 combines the collection of individual scoring functions 904 as follows. Let $f_1(.), \ldots, f_p(.)$ be the scoring functions of the positive example sets, where p is the number of positive example sets, and let $g_1(.), \ldots, g_n(.)$ be the scoring functions of the negative example sets, where n is the number of negative examples. Step 905 produces a function S(.) that assigns to each element x of the feature space the score:

$$S(x) = \min\{\max_{i=1\ldots p}\{f_i(x)\}, 1-\max_{j=1\ldots n}\{g_j(x)\}\} \quad (3)$$

Namely, step 905 computes the maximum score with respect to all the positive example sets, subtracts from one the maximum score with respect to the negative example sets and computes the minimum. Equation (3) satisfies requirements (I), (II), and (III). If a point in the feature space has a low score with respect to all positive example sets, then $\max_{i=1\ldots p}\{f_i(x)\}$ is a small number, and S(x) is small irrespective of the value of $1-\max_{j=1\ldots n}\{g_j(x)\}$, hence, equation (3) satisfies requirement (I). If a point x has a high score with respect to at least one of the negative example sets, $\max_{j=1\ldots n}\{g_j(x)\}$ is a large number, hence $1-\max_{j=1\ldots n}\{g_j(x)\}$ is a small number and S(x) satisfies requirement (II). It is therefore evident that requirement (III) is also satisfied. It is to be understood that the present invention contemplates that other methods for combining individual scores can be used.

The multiple example sets can also be used together, rather than sequentially, to produce a scoring function. We assume that no representative sample of positive example sets is identical to the representative sample of negative example sets. If this happens, in a preferred embodiment, the representative sample of the positive example set is ignored.

Figure 10:
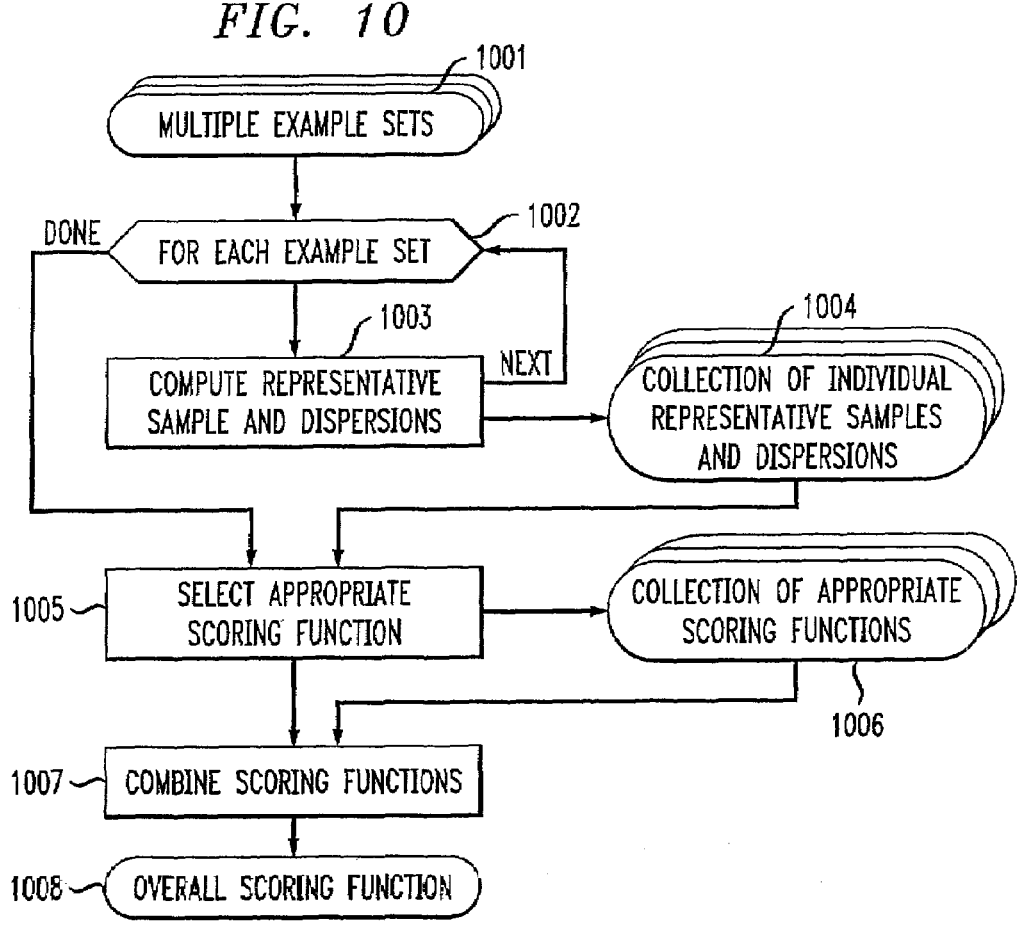
FIG. 10 is a flow diagram illustrating a method of constructing a scoring function from multiple example sets according to another embodiment of the present invention.

Referring now to FIG. 10, a flow diagram illustrates a method of constructing a scoring function from multiple example sets 1001 according to another embodiment of the present invention. In this particular embodiment, step 1002 iterates over the multiple example sets, and step 1003 computes the representative function and dispersion characterization for each of the example sets. The result collection 1004 is then jointly analyzed in step 1005, which selects appropriate scoring functions. In a preferred embodiment, step 1005 modifies the dispersion characterizations so that each negative example gives very low scores to all positive examples, where the score is computed as previously described; and each positive example gives very low scores to all negative examples.

In another preferred embodiment, where step 606 of FIG. 6 satisfies requirements (3) and (4), step 1005 modifies the values of the thresholds $T_1$ and $T_2$. In another preferred embodiment, step 1005 selects the dissimilarity function among a collection of dissimilarity functions that best satisfies the above-mentioned requirements (I), (II), and (III). In yet another embodiment, step 1005 selects from a collection the dissimilarity-to-score conversion function that best satisfies the above-mentioned requirements (I), (II), and (III). It is to be appreciated that the invention contemplates combining two or more of the above-described methods for performing step 1005. For example, step 1005 may simultaneously modify the dispersion characterizations and the values of the thresholds $T_1$ and $T_2$.

Step 1005 yields a collection of modified scoring functions 1006; $f'_1(.), \ldots, f'_p(.)$ for the positive example sets and $g'_1(.), \ldots, g'_n(.)$ for the negative examples. Step 1007 combines the scoring functions. In a preferred embodiment, step 1007 uses equation (3) with f' instead of f and g' instead of g.

Figure 11:
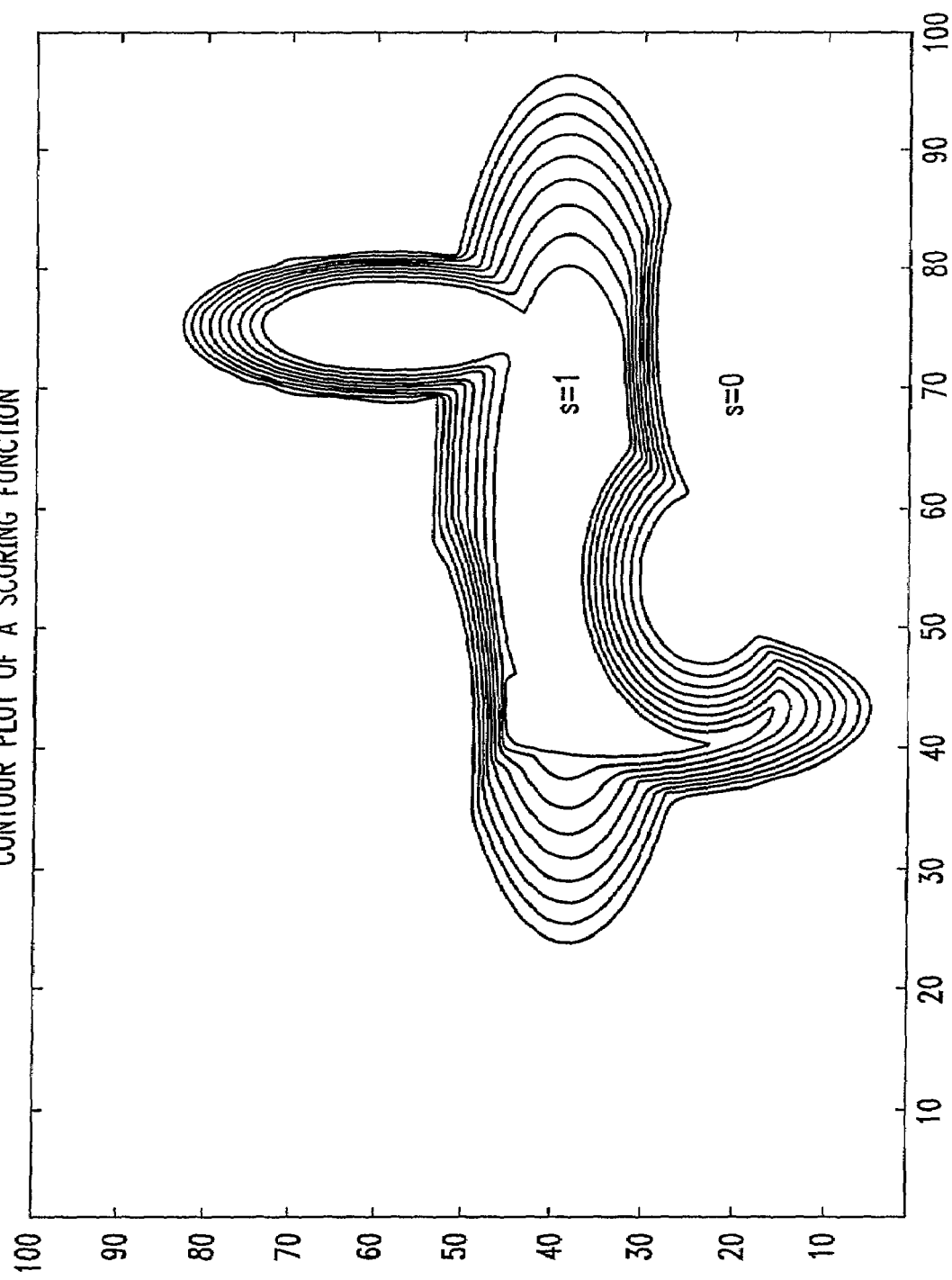
FIG. 11 is a diagram graphically depicting an example of a contour plot of a scoring function obtained from three positive example sets and two negative example sets using the procedure of FIG. 10.

FIG. 11 shows an example of a scoring function that can be obtained with three positive and two negative example sets. Comparison with FIG. 8 reveals the flexibility of the method of constructing scoring functions from multiple positive and negative example sets in accordance with the invention.

It is to be appreciated that the procedures described in the figures can also be adapted to the case where the user adds information to the example sets in the form of a score or a qualitative assessment (i.e., by telling that a certain example set is "very positive," while another is "moderately negative"). For example, the maximum score of each example set would be changed from one to the score provided by the user or to a value corresponding to the qualitative assessment. Additionally, the mutual influence of different example sets can also be dependent on the scores or qualitative assessments of the example sets, by adding appropriate requirements to (I), (II), and (III), such as:

(IV) The influence of the example sets on points depend on the score of the example sets. Example sets with more extreme scores, either positive or negative, have higher influence than example sets with less extreme scores.

Searching a database by computing the score of each of the contained items using, for instance, equation (3) can be a computationally intensive and time-consuming operation. The value of the present invention also lies in the ability of performing the search interactively, allowing the user to evaluate the results of the search, and modify the query by iteratively adding new example sets or removing existing example sets from the query specification. This interactive query refinement process is possible only if the query engine quickly returns results. It is therefore preferable to use an indexing structure that supports searches based on the scoring functions constructed in accordance with the present invention. Also, since indexing structures are computationally expensive to construct and to maintain (construction is a rare occasion, while maintenance is required every time a new item is added to the database or an existing item is removed), a method for searching existing indexing structures is preferable to a method that requires a new indexing structure. One skilled in the art will appreciate that the method of searching an existing indexing structure can also be applied to a new indexing structure.

Numerous multidimensional indexing structures have been proposed in the literature. The vast majority (e.g., see the above-referenced V. Gaede et al. article, "Multidimensional Access Methods") are related to the R-Tree, the Grid File, the K-D Tree and the Quadtree. These methods perform recursive partitioning of the search space using hyperplanes (or hyperrectangles) aligned with the coordinate axes (that represent the different attributes of the database items).

Indexing embodiments described herein refer to a specific multidimensional indexing structure called "Ordered Partition," disclosed in the above-referenced B. S. Kim et al., "A Fast K Nearest Neighbor Algorithm Based on the Order Partition." The only property of this indexing structure that is relevant to the invention is the fact that the search space is partitioned using hyperplanes aligned with the coordinate axes, namely, the general property of the indexing structures mentioned above. It has been chosen to describe the embodiments because it is simple to describe. Given a database where items have D dimensions, the ordered partition divides the search space into n parts using n−1 (D-1)-dimensional hyperplanes that are perpendicular to the first dimension. These hyperplanes are placed in appropriate positions in order to have approximately the same number of database items in each of the n parts. Then, each of the n parts is separately divided into n parts using n−1 hyperplanes that are perpendicular to the second dimension, in such a way that each of the new parts contains approximately the same number of database items. The process is recursively repeated, as described in the B. S. Kim et al. article, until all dimensions are exhausted, or the individual cells produced by the recursive partitioning contain fewer than a predefined number of points. The choice of n is performed to satisfy these criteria, as described in the B. S. Kim et al. article. The recursive partition can be represented (graphically and as a data structure within a computer) as a tree, wherein each node corresponds to a cell and its descendants correspond to all the cells that are obtained by partitioning with the hyperplanes along the next dimension. The leaves, namely, the nodes that do not have descendants, contain the actual database items or a reference to them. The recursive partition can be efficiently used for nearest neighbor queries, as described in the B. S. Kim et al. article, because of its tree structure.

In all the embodiments described below, the following assumptions are made: the above-mentioned properties (1), (2), (3), (4), (I), (II), and (III) are satisfied.

Figure 12:
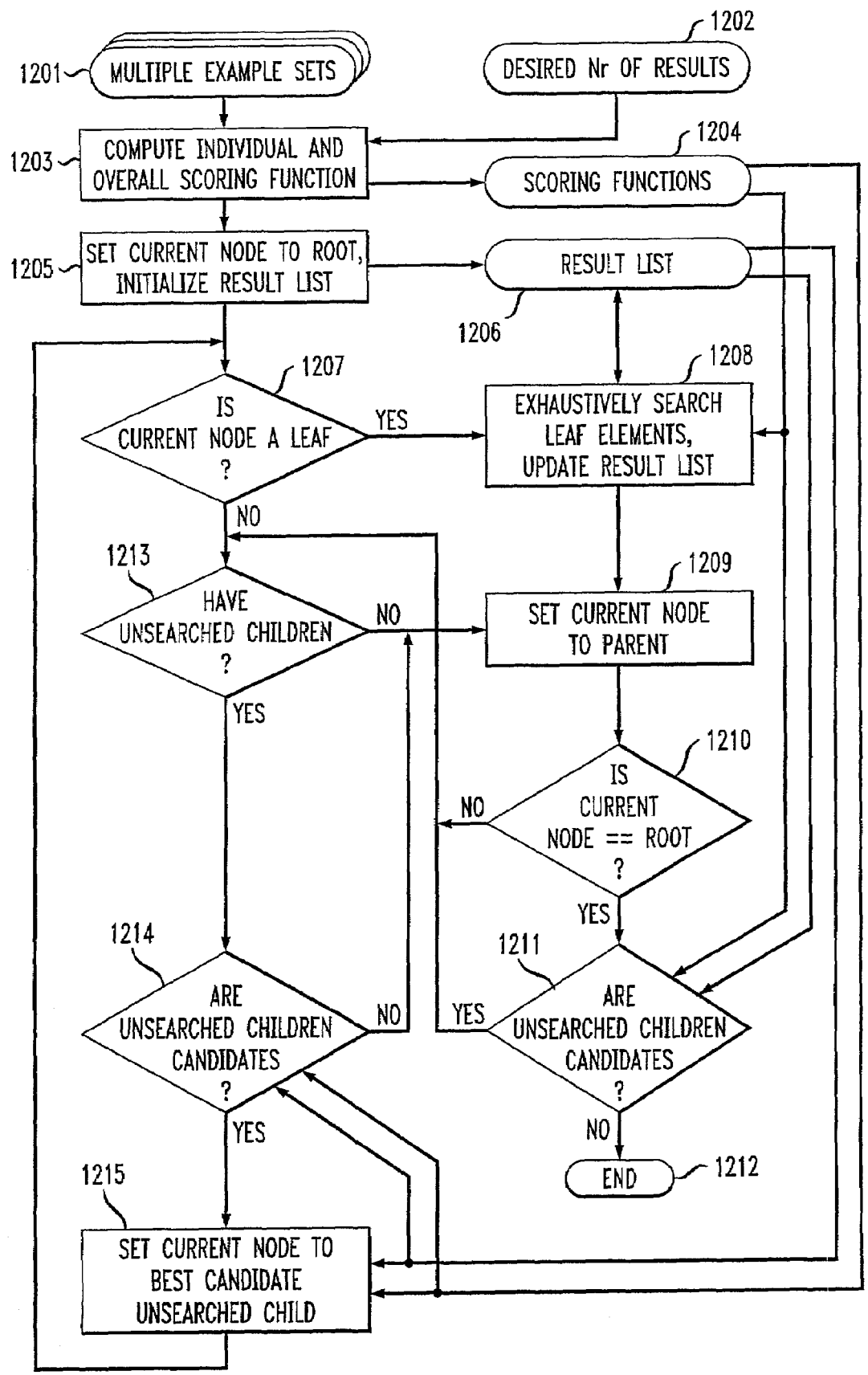
FIG. 12 is a flow diagram illustrating an embodiment according to the invention of a method of searching a multidimensional indexing structure to retrieve the database item having the highest score according to the scoring function obtained using the procedures of FIG. 9 or FIG. 10.

FIG. 12 is a flow diagram illustrating an embodiment according to the invention of a method of searching a multidimensional indexing structure to retrieve the database item having the highest score according to the scoring function obtained using the procedures of FIG. 9 or FIG. 10. More specifically, FIG. 12 shows a preferred method of searching a recursive partitioning indexing structure in accordance with one embodiment of the present invention.

The user provides multiple positive and negative example sets 1201 and the number of desired results 1202. The search algorithm returns the number of desired results. Every database item which is not returned by the search has a score smaller than the score of any of the returned results.

The algorithm begins with step 1203 computing the scoring functions 1204, for instance, as previously described. Step 1205 initializes the search by setting the current node to the root of the search tree and by initializing the list of current results 1206 to an empty list. The query execution then proceeds with step 1207 which determines if the current node is a leaf. In a preferred embodiment, step 1207 relies on mechanisms of the existing indexing structure to determine if the current node is a leaf. If the current node is a leaf, step 1208 searches the leaf. In a preferred embodiment, step 1208 searches the leaf node exhaustively, namely, step 1208: computes the score of each of the database items that are associated with the leaf node using the overall scoring function 1204; compares the score with the scores in the current list of results 1206; and adds the item with its score to the list 1206 if the list 1206 contains less than the desired number of results 1202, or if the score of at least one of the items contained in the list 1206 is lower than the score of the database item being analyzed. When all the items associated with the leaf are analyzed and the list 1206 is appropriately updated, step 1209 sets the current node to the parent of the current node.

Step 1210 checks if the current node is the root. If the current node is the root, step 1211 checks whether there are unsearched candidate children. A child is a candidate if it can contain database items with scores higher than the lowest score of any database item in the result list 1206, or if the result list 1206 contains less than the number of desired results 1202. If the root does not have candidate children, the computation terminates (block 1212) and the current result list 1206 is the result of the query. If step 1210 determines that the current node is not the root, if step 1211 determines that there are candidate children, or if step 1207 determines that the current node is not a leaf, the computation continues from step 1213. Step 1213 determines if there are unsearched children. If there are not unsearched children, step 1209 is executed as described above. If there are unsearched children, step 1214 determines if there are candidates among the unsearched children. If there are no candidates, step 1209 is executed as described above, otherwise step 1215 sets the current node to the best candidate child and the computation continues from step 1207.

Steps 1214, 1215 and 1211 use the scoring functions 1204 and the result list 1206. One skilled in the art will recognize that FIG. 12 describes a branch-and-bound search type algorithm. One feature that distinguishes the algorithm of FIG. 12 over existing algorithms is the use of multiple positive and negative example sets in determining the existence of candidate children and in determining the best candidate child.

Figure 13:
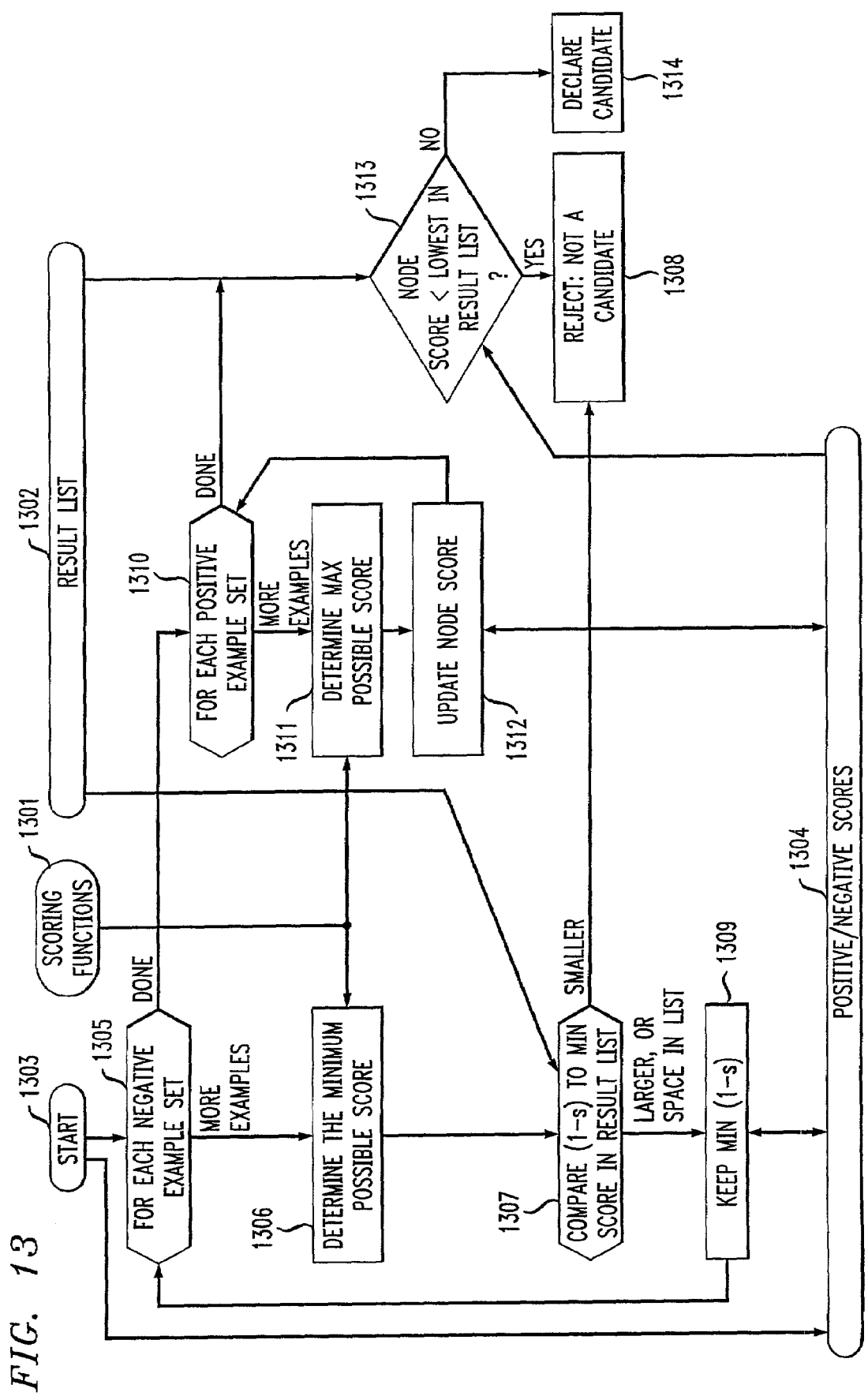
FIG. 13 is a flow diagram illustrating a method of determining whether a node of a multidimensional indexing structure is a candidate during a search.

FIG. 13 is a flow diagram illustrating a method of determining whether a node of a multidimensional indexing structure is a candidate during a search. More specifically, FIG. 13 shows a method of determining whether a node is a candidate and computing its score, when equation (3) is used to compute the scores. Step 1303 initializes the positive node score (the score with respect to the positive example sets) to zero and the negative node score (the score with respect to the negative example sets) to one. Block 1304 represents the positive and negative node scores.

The iterator 1305 considers each negative example set in the sequence. If there are unused negative example sets, step 1306 uses the corresponding scoring function g( ) (block 1301) and determines the minimum possible score of any point in the currently analyzed node, according to the scoring function g( ). Call this minimum possible score s. Step 1307 compares (1−s) with the minimum of the scores in the current result list. If the list is full (i.e., it contains the number of desired results) and (1−s) is smaller than the minimum score in the list, step 1308 declares that the node is not a candidate, and the procedure ends. Otherwise, step 1309 updates the negative node score 1304. If the current negative node score is smaller than (1−s), the negative node score 1304 is unchanged, otherwise it is set to (1−s), and the next negative example set is used.

When the last negative example set has been used, iterator 1310 uses each positive example set in turn. For each positive example set, step 1311 uses the corresponding scoring function f( ) and determines the maximum possible score of any point within the portion of the search space corresponding to the current node. Call this quantity r. Step 1312 updates the positive node score 1304 by comparing it to r. If r is larger than the current positive score, the positive score is set to r. When the last positive example set has been used, step 1313 computes the node score as the minimum of the positive node score and of the negative node score. Step 1313 then compares the node score with the lowest score in the result list 1302. If the node score is smaller, step 1308 declares that the node is not a candidate. Otherwise, Step 1314 declares the node to be a candidate.

Figure 14:
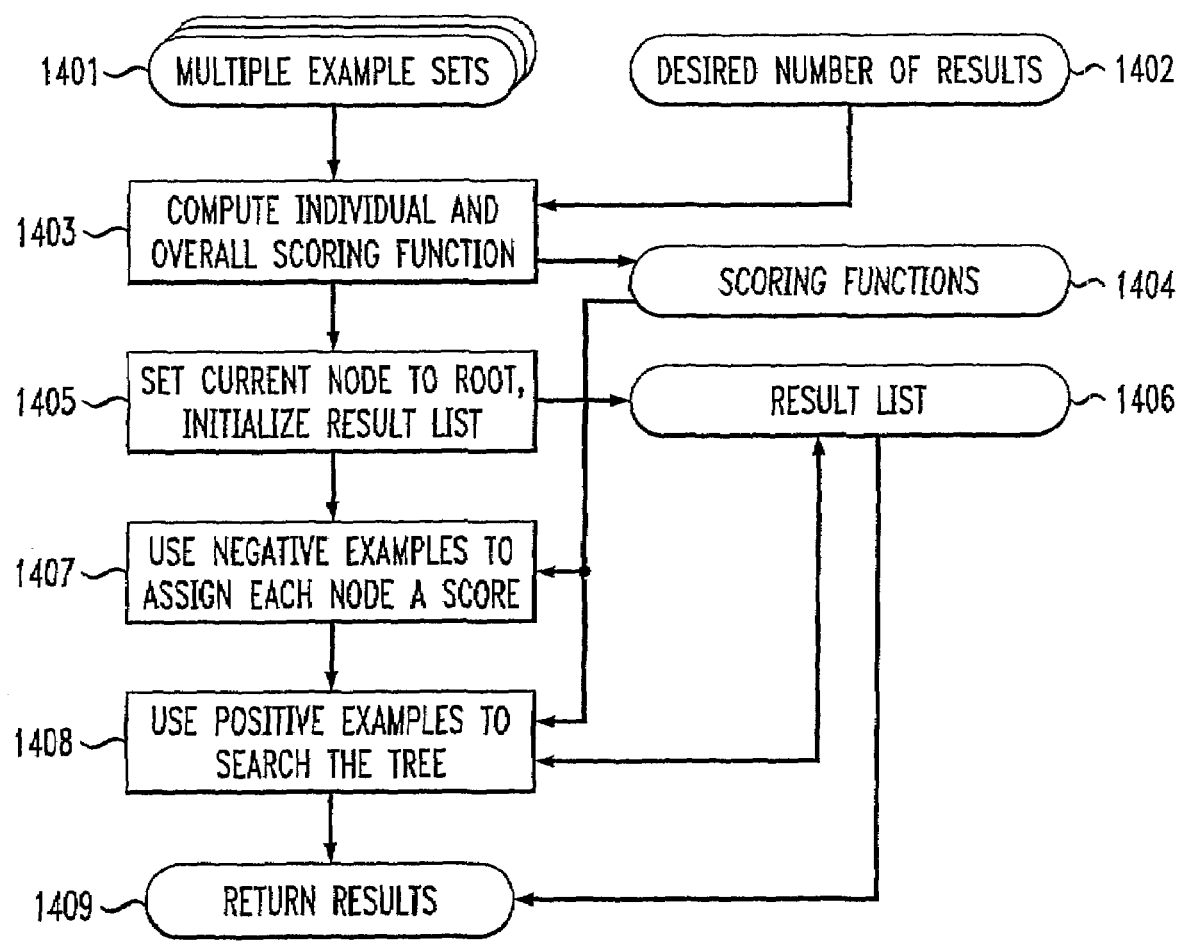
FIG. 14 is a flow diagram illustrating another embodiment according to the invention of a method of searching a multidimensional indexing structure to retrieve the database item having the highest score according to the scoring function obtained using the procedures of FIG. 9 or FIG. 10.

FIG. 14 illustrates another embodiment for determining whether a node of a multidimensional indexing structure is a candidate during a search. In FIG. 14, the user provides multiple positive and negative example sets 1401 and the number of desired results 1402 when submitting the query. In response to the query, the search engine: computes individual and overall scoring functions 1404 in step 1403; initializes the search in step 1405 by setting the current node to the root; initializes the result list 1406 to empty; then uses the negative examples only to assign a score to each node of the tree in step 1407; and then searches the tree with the positive examples alone in step 1408, which also updates the result list 1406. Step 1408 also uses the assigned negative scores to decide whether nodes are candidates. Step 1409 returns the result list 1406 to the user. In a preferred embodiment, step 1407 is performed by steps 1305, 1306 and 1309 as described in FIG. 13. In a preferred embodiment, step 1408 is performed by steps 1310, 1311 and 1312 as described in FIG. 13.

Figure 15:
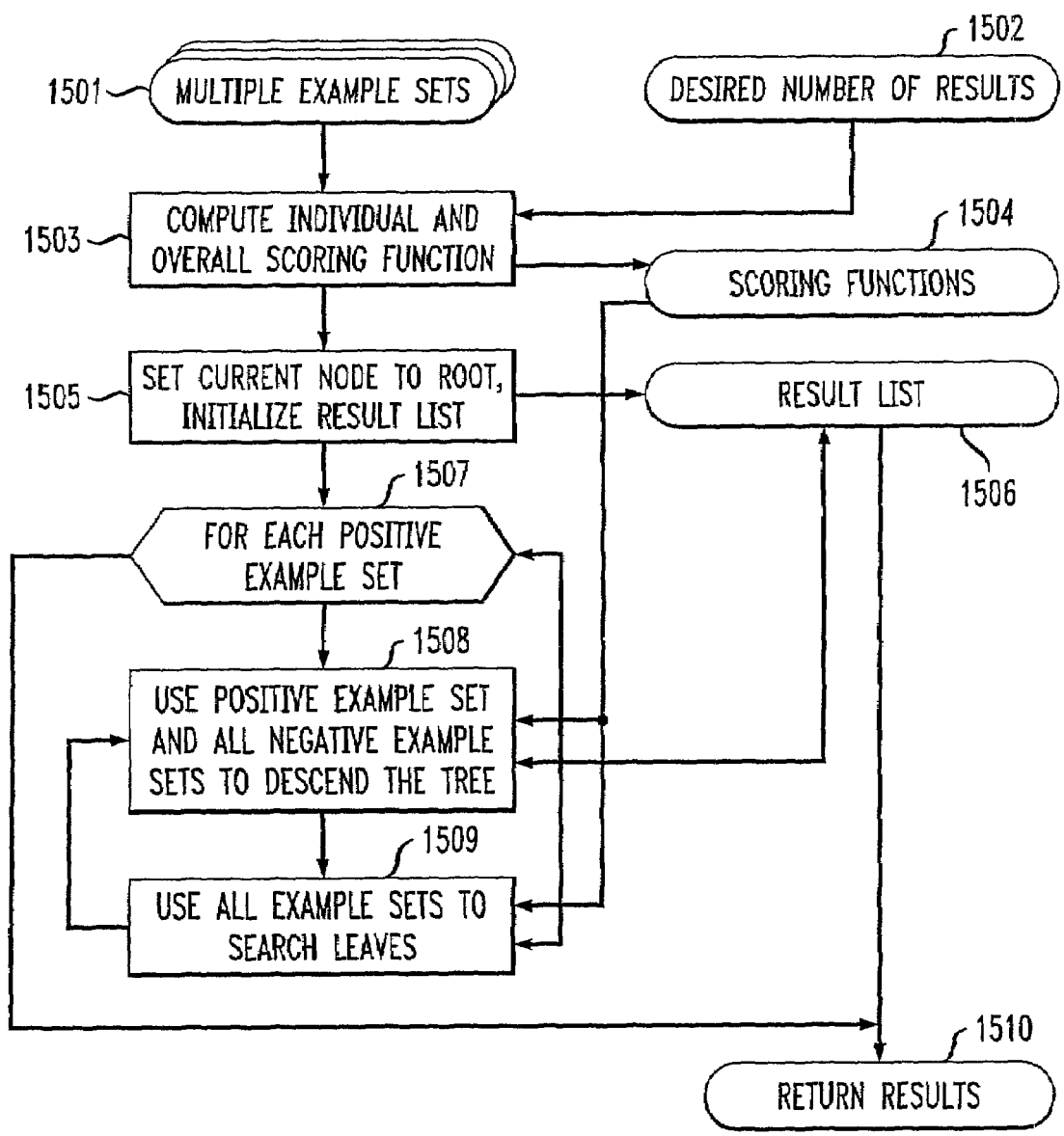
FIG. 15 is a flow diagram illustrating yet another embodiment according to the invention of a method of searching a multidimensional indexing structure to retrieve the database item having the highest score according to the scoring function obtained using the procedures of FIG. 9 or FIG. 10.

FIG. 15 illustrates yet another embodiment for determining whether a node of a multidimensional indexing structure is a candidate during a search. In FIG. 15, the user provides multiple positive and negative example sets 1501 and the number of desired results 1502 when submitting the query. In response to the query, the search engine: computes individual and overall scoring functions 1504 in step 1503; initializes the search in step 1505 by setting the current node to the root; initializes the result list 1506 to empty. Iterator 1507 iterates over the individual positive example sets. For each positive example set, step 1508 descends the tree by identifying candidate nodes until it reaches candidate leaves using the scoring functions of the specific positive example set and of all the negative example sets. Step 1509 uses the scoring function of all positive and negative example sets. Steps 1508 and 1509 continue until no more candidate leaves exist. During the descent in step 1508, scores are associated to the nodes of the tree. If the node does not have a score, its positive and negative scores become the ones computed in step 1508. If the node already has a score, the negative score is not changed (since it has already been computed using all negative examples), and the positive node score becomes the maximum of the current positive node score and the positive node score computed by step 1508. The overall node score is then the minimum between the positive and the negative node scores. If a node already has scores, in a preferred embodiment, step 1508 does not recompute its negative node score. In a preferred embodiment, if the negative node score is smaller than the minimum of the scores in the result list 1506, the node is automatically declared a non-candidate node by step 1508. Step 1509 also marks the searched leaf nodes. Since the search is performed with all positive and negative scoring functions, it is unnecessary to search the same leaf node twice. In another preferred embodiment, step 1509 may use only one positive scoring function, namely, the same used by step 1508, and all negative scoring functions. When all the positive examples have been exhausted, step 1510 returns the result set 1506.

It is to be appreciated that the searching methods of the invention may be easily adapted to multidimensional indexing structures where the hyperplanes or hyperrectangles are not necessarily parallel to the coordinate axes, and to multidimensional indexing structures where partitioning is performed using other types of surfaces, for example, including spheres and polygons. Further, the methods for searching may be trivially adapted to multidimensional indexing structures that store database items or references to database items both at leaves and at internal nodes.

Figure 16:
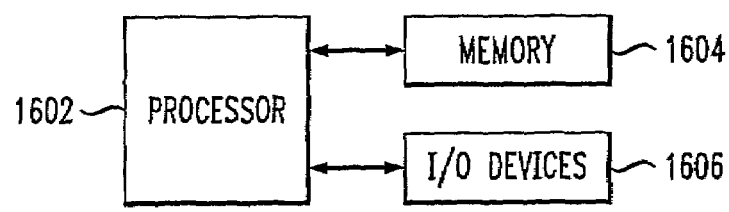
FIG. 16 is a block diagram illustrating a generalized hardware architecture of a computer system suitable for implementing similarity retrieval according to the present invention.

Referring now to FIG. 16, a block diagram illustrates a generalized hardware architecture of a computer system suitable for implementing similarity retrieval according to the present invention. Specifically, the architecture of FIG. 16 may represent a computer system used to implement the search engine 101 (FIG. 1) and/or the one or more computer systems used to implement the database management systems 105, 106 and 107, as well as their respective storage servers 108 (all shown in FIG. 1). Also, the architecture of FIG. 16 may represent a computer system used to implement the user interface 103 (FIG. 1).

As shown in FIG. 16, the computer system may comprise a processor 1602, a memory 1604 and I/O devices 1606. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for entering data to the processing unit, and/or one or more output devices (e.g., CRT display, printer, etc.) for presenting results associated with the processing unit. It is also to be understood that the term "processor" may refer to more than one processing device and that various elements associated with a processing device may be shared by other processing devices.

Accordingly, software components or programs including instructions or code for performing the indexing and searching methodologies of the invention, as described herein in accordance with the preceding figures, may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of retrieving one or more items from at least one database in response to a query specified by a user via a plurality of positive and negative example sets, the method comprising the steps of:

constructing a scoring function from the plurality of positive and negative example sets, wherein the scoring function is operable for use with a multidimensional indexing structure capable of supporting similarity queries and associated with the at least one database, wherein the scoring function is constructed by combining respective scoring functions of the plurality of positive and negative example sets, and wherein combining respective scoring functions comprises the steps of modifying the scoring functions of the plurality of positive and negative example sets so that the scoring functions of the positive example sets assign low scores to representative samples of the negative example sets, and so that the scoring functions of the negative example sets assign low scores to representative samples of the positive example sets, and combining the modified scoring functions of the plurality of positive and negative example sets;

querying the at least one database in accordance with the scoring function, wherein higher scores are associated with database items more closely related to the query; and retrieving, via the multidimensional indexing structure, the one or more database items that have the highest score as computed using the scoring function.

2. The method of claim 1, wherein the scoring function assigns a score to an element of a search space associated with the at least one database equal to the minimum of: (i) the maximum of the scores assigned to the element by the scoring functions of the positive example sets; and (ii) the minimum of one minus the scores assigned to the element by the scoring functions of the negative example sets.

3. The method of claim 1, wherein the scoring function gives higher scores to database items that are more closely related to the query than to database items that are not as closely related to the query.

4. The method of claim 1, wherein the scoring function is obtained for each of the plurality of positive and negative example sets by:
computing a characteristic example from each example set;
computing a dispersion characterization of each example set in association with the characteristic example; and
using the characteristic example, the dispersion characterization, and one or more samples from the database to compute the scoring function.

5. The method of claim 4, wherein the characteristic example is a centroid, a median, or a mode computed over at least a portion of the example set.

6. The method of claim 4, wherein the dispersion characterization associated with the example set comprises a covariance matrix, a standard deviation, central moments, order statistics of differences, or third moments capturing asymmetry.

7. The method of claim 4, wherein the step of using the characteristic example, the dispersion characterization, and one or more samples from the database to compute the scoring function further comprises computing weighted distances between the characteristic example and the one or more samples from the database using the dispersion characterization to compute weights.

8. The method of claim 7, wherein the weighted distances are Euclidean distances or Minkowsky distances.

9. The method of claim 1, wherein the scoring function is computed for each of the plurality of positive and negative example sets by converting one or more semi-metrics obtained using the each example set to one or more scores using a conversion function.

10. The method of claim 9, wherein the semi-metrics are weighted Minkowsky distances from a representative sample of examples in each of the plurality of positive and negative example sets, and further wherein weights are calculated using the examples in each example set.

11. The method of claim 10, wherein the weights are the inverse of standard deviations of the examples in each example set.

12. The method of claim 10, wherein the representative sample is a centroid of the examples in each example set.

13. The method of claim 9, wherein the conversion function is a monotonically non-increasing continuous function having a value equal to one at the origin and a value of zero at infinity.

14. The method of claim 13, wherein the conversion function is a monotonically non-increasing continuous function having a value of one between zero and a first threshold value and a value of zero after a second threshold value.

15. The method of claim 1, wherein the user specifies the number of items to retrieve from the database.

16. The method of claim 1, wherein the retrieving step further comprises the step of searching the multidimensional indexing structure to retrieve from the database the items having the highest score.

17. The method of claim 16, wherein the multidimensional indexing structure is used to execute different queries.

18. The method of claim 16, wherein the multidimensional indexing structure is based on a recursive partition of a search space associated with the database using hyperplanes parallel to coordinate axes or surfaces other than hyperplanes parallel to coordinate axes.

19. The method of claim 16, wherein searching the multidimensional indexing structure comprises the steps of:
using scoring functions of the plurality of positive and negative example sets to search a tree to identify candidate nodes; and
using the scoring functions of the plurality of positive and negative example sets to score items stored at leaves of the multidimensional indexing structure.

20. The method of claim 19, wherein identifying candidate nodes comprises the steps of:
computing for each scoring function of the positive example sets, the maximum possible score of an item stored at the node or at one of the descendants of the node;
computing the maximum of the maximum scores;
computing for each scoring function of the negative example sets, the minimum possible score of an item stored at the node or at one of the descendants of the node;
computing the minimum of one minus the minimum scores;
computing the minimum of: (i) the maximum of the maximum scores; and (ii) the minimum of one minus the minimum scores;
comparing the computed minimum to the minimum of the scores in a current result set;
declaring that a node is a candidate if the minimum is not smaller than the minimum of the scores in the current result set; and
declaring that the node is not a candidate otherwise.

21. The method of claim 19, wherein the search is performed by using the scoring functions of the positive example sets one at a time in conjunction with the scoring functions of the negative example sets.

22. Apparatus for retrieving one or more items from at least one database in response to a query specified by a user via a plurality of positive and negative example sets, the apparatus comprising:

at least one processor operative to: (i) construct a scoring function from the plurality of positive and negative example sets, wherein the scoring function is operable for use with a multidimensional indexing structure capable of supporting similarity queries and associated with the at least one database, wherein the scoring function is constructed by combining respective scoring functions of the plurality of positive and negative example sets, and wherein combining respective scoring functions comprises the steps of modifying the scoring functions of the plurality of positive and negative example sets so that the scoring functions of the positive example sets assign low scores to representative samples of the negative example sets, and so that the scoring functions of the negative example sets assign low scores to representative samples of the positive example sets, and combining the modified scoring functions of the plurality of positive and negative example sets; (ii) query the at least one database in accordance with the scoring function, wherein higher scores are associated with database items more closely related to the query; and (iii) retrieve, via the multidimensional indexing structure, the one or more database items that have the highest score as computed using the scoring function; and memory, coupled to the at least one processor, for storing at least a portion of results of one or more of the constructing and retrieving operations.

23. The apparatus of claim 22, wherein the scoring function assigns a score to an element of a search space associated with the at least one database equal to the minimum of: (i) the maximum of the scores assigned to the element by the scoring functions of the positive example sets; and (ii) the minimum of one minus the scores assigned to the element by the scoring functions of the negative example sets.

24. The apparatus of claim 22, wherein the scoring function gives higher scores to database items that are more closely related to the query than to database items that are not as closely related to the query.

25. The apparatus of claim 22, wherein a scoring function is obtained for the each of the plurality of positive and negative example sets by: (i) computing a characteristic example from each example set; (ii) computing a dispersion characterization of each example set in association with the characteristic example; and (iii) using the characteristic example, the dispersion characterization, and one or more samples from the database to compute the scoring function.

26. The apparatus of claim 25, wherein the characteristic example is a centroid, a median, or a mode computed over at least a portion of the example set.

27. The apparatus of claim 25, wherein the dispersion characterization associated with the example set comprises a covariance matrix, a standard deviation, central moments, order statistics of differences, or third moments capturing asymmetry.

28. The apparatus of claim 25, wherein the operation of using the characteristic example, the dispersion characterization, and one or more samples from the database to compute the scoring function further comprises computing weighted distances between the characteristic example and the one or more samples from the database using the dispersion characterization to compute weights.

29. The apparatus of claim 28, wherein the weighted distances are Euclidean distances or Minkowsky distances.

30. The apparatus of claim 22, wherein a scoring function is computed for each of the plurality of positive and negative example sets by converting one or more semi-metrics obtained using the each example set to one or more scores using a conversion function.

31. The apparatus of claim 30, wherein the semi-metrics are weighted Minkowsky distances from a representative sample of examples in each of the plurality of positive and negative example sets, and further wherein weights are calculated using the examples in each example set.

32. The apparatus of claim 31, wherein the weights are the inverse of standard deviations of the examples in each example set.

33. The apparatus of claim 31, wherein the representative sample is a centroid of the examples in each example set.

34. The apparatus of claim 30, wherein the conversion function is a monotonically non-increasing continuous function having a value equal to one at the origin and a value of zero at infinity.

35. The apparatus of claim 34, wherein the conversion function is a monotonically non-increasing continuous function having a value of one between zero and a first threshold value and a value of zero after a second threshold value.

36. The apparatus of claim 22, wherein the user specifies the number of items to retrieve from the database.

37. The apparatus of claim 22, wherein the retrieving step further comprises the step of searching the multidimensional indexing structure to retrieve from the database the items having the highest score.

38. The apparatus of claim 37, wherein the multidimensional indexing structure is used to execute different queries.

39. The apparatus of claim 37, wherein the multidimensional indexing structure is based on a recursive partition of a search space associated with the database using hyperplanes parallel to coordinate axes or surfaces other than hyperplanes parallel to coordinate axes.

40. The apparatus of claim 37, wherein searching the multidimensional indexing structure comprises: (i) using scoring functions of the plurality of positive and negative example sets to search a tree to identify candidate nodes; and (ii) using the scoring functions of the plurality of positive and negative example sets to score items stored at leaves of the multidimensional indexing structure.

41. The apparatus of claim 40, wherein identifying candidate nodes comprises: (i) computing for each scoring function of the positive example sets, the maximum possible score of an item stored at the node or at one of the descendants of the node; (ii) computing the maximum of the maximum scores; (iii) computing for each scoring function of the negative example sets, the minimum possible score of an item stored at the node or at one of the descendants of the node; (iv) computing the minimum of one minus the minimum scores; (v) computing the minimum of: (a) the maximum of the maximum scores; and (b) the minimum of one minus the minimum scores; (vi) comparing the computed minimum to the minimum of the scores in a current result set; (vii) declaring that a node is a candidate if the minimum is not smaller than the minimum of the scores in the current result set; and (viii) declaring that the node is not a candidate otherwise.

42. The apparatus of claim 40, wherein the search is performed by using the scoring functions of the positive example sets one at a time in conjunction with the scoring functions of the negative example sets.

43. A method for making a computer implemented process to enable retrieval of one or more items from at least one database in response to a query specified by a user via a plurality of positive and negative example sets, the method comprising the steps of:

instantiating first computer instructions onto a computer readable medium, the first computer instructions configured to construct a scoring function from the plurality of positive and negative example sets, wherein the scoring function is operable for use with a multidimensional indexing structure capable of supporting similarity queries and associated with the at least one database, wherein the scoring function is constructed by combining respective scoring functions of the plurality of positive and negative example sets, and wherein combining respective scoring functions comprises the steps of modifying the scoring functions of the plurality of positive and negative example sets so that the scoring functions of the positive example sets assign low scores to representative samples of the negative example sets, and so that the scoring functions of the negative example sets assign low scores to representative samples of the positive example sets, and combining the modified scoring functions of the plurality of positive and negative example sets;

instantiating second computer instructions onto a computer readable medium, the second computer instructions configured to query the at least one database in accordance with the scoring function, wherein higher scores are associated with database items more closely related to the query; and instantiating third computer instructions onto a computer readable medium, the third computer instructions configured to retrieve, via the multidimensional indexing structure, the one or more database items that have the highest score as computed using the scoring function.

* * * * *

UNITED STATES PATENT AND TRADEMARK OFFICE
CERTIFICATE OF CORRECTION

PATENT NO. : 7,266,545 B2
APPLICATION NO. : 09/923530
DATED : September 4, 2007
INVENTOR(S) : L. D. Bergman et al.

Page 1 of 1

It is certified that error appears in the above-identified patent and that said Letters Patent is hereby corrected as shown below:

Title page, item [54]

In the title, please insert --DATA-- after the word 'INDEXING' and before the word 'IN'.

Col. 9, line 12, please delete "$|y[i]-c[j]|$" and insert --$|y[j]-c[j]|$--.

Signed and Sealed this

Fourth Day of March, 2008

JON W. DUDAS
*Director of the United States Patent and Trademark Office*

UNITED STATES PATENT AND TRADEMARK OFFICE
CERTIFICATE OF CORRECTION

PATENT NO. : 7,266,545 B2 Page 1 of 1
APPLICATION NO. : 09/923530
DATED : September 4, 2007
INVENTOR(S) : L. D. Bergman et al.

It is certified that error appears in the above-identified patent and that said Letters Patent is hereby corrected as shown below:

Title page, item [54] and Column 1, line 2

In the title, please insert --DATA-- after the word 'INDEXING' and before the word 'IN'.

Col. 9, line 12, please delete "|y[i]-c[j]|" and insert --|y[j]-c[j]|--.

This certificate supersedes the Certificate of Correction issued March 4, 2008.

Signed and Sealed this

First Day of April, 2008

JON W. DUDAS
*Director of the United States Patent and Trademark Office*